Figure 1:
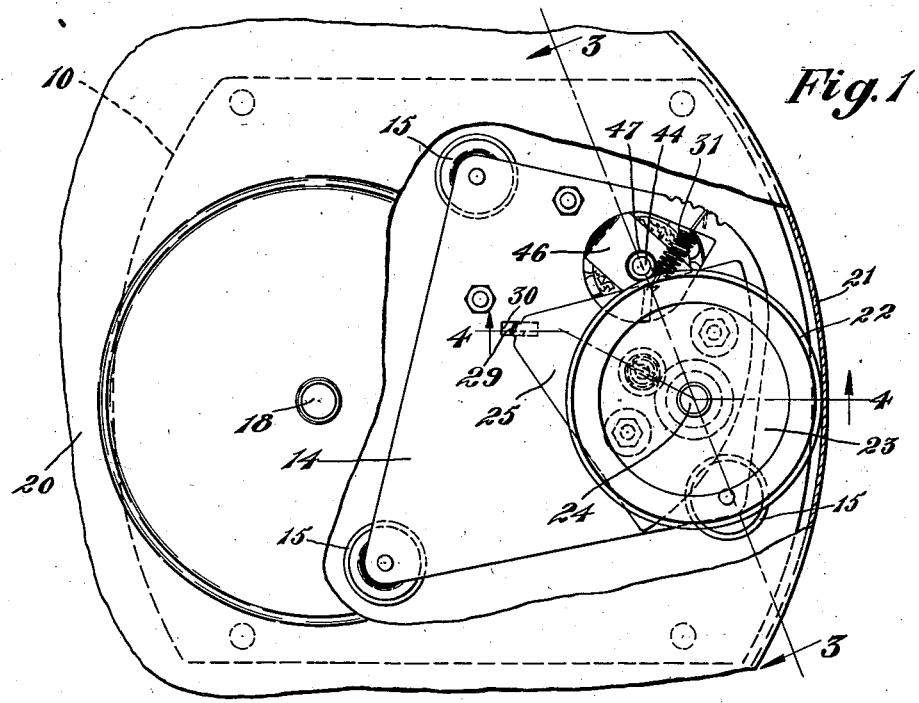

Nov. 4, 1941.   E. V. SCHNEIDER   2,261,889
SHADED POLE TYPE MOTOR TURNTABLE DRIVE
Filed Sept. 14, 1939   2 Sheets-Sheet 1

Inventor
Emmor V. Schneider
By Frease & Bishop
Attorneys

Nov. 4, 1941.   E. V. SCHNEIDER   2,261,889
SHADED POLE TYPE MOTOR TURNTABLE DRIVE
Filed Sept. 14, 1939   2 Sheets-Sheet 2
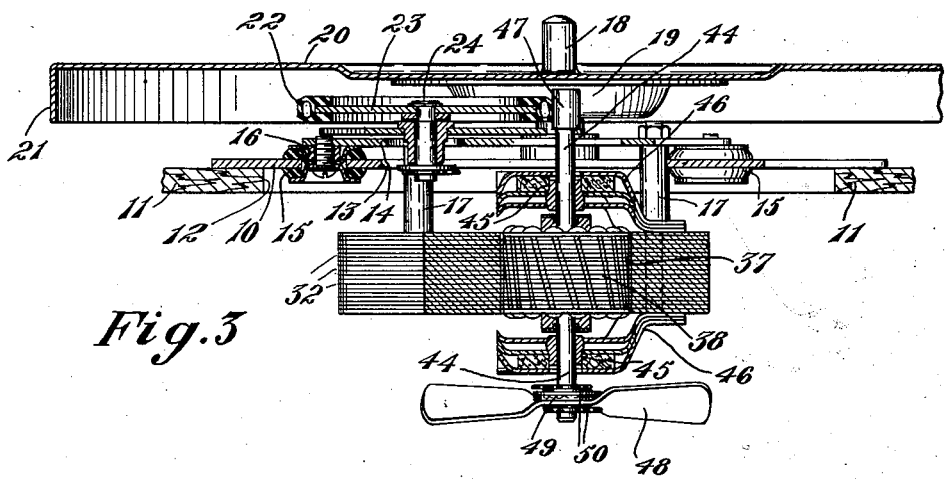
Fig. 3
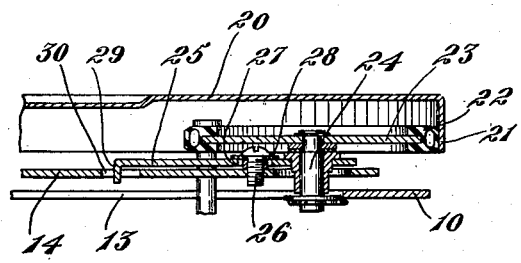
Fig. 4
Fig. 6
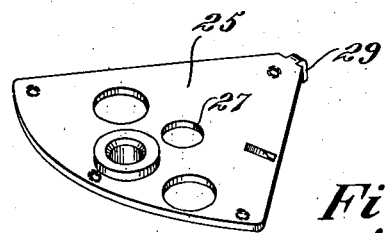
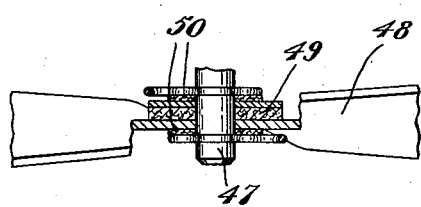
Fig. 5
Inventor
Emmor V. Schneider
By Frease and Bishop
Attorneys Patented Nov. 4, 1941

2,261,889

UNITED STATES PATENT OFFICE 2,261,889

SHADED POLE TYPE MOTOR TURNTABLE DRIVE

Emmor V. Schneider, Alliance, Ohio, assignor to Alliance Manufacturing Company, Alliance, Ohio, a corporation of Ohio Application September 14, 1939, Serial No. 294,938

1 Claim. (Cl. 74—206)

The invention relates to an induction motor drive for phonograph turntables and the like, and contemplates certain improvements in the construction of a shaded pole type of motor and the mounting therefor to produce a simple, economical and efficient friction drive for the turntable which will operate quietly, at a uniform speed, and substantially free from mechanical or electrical vibrations.

The recent revival of interest in radio phonograph combination units has created a considerable demand for a low priced, electric turntable drive for phonographs. The essential requirements of a phonograph turntable drive are quietness of operation, uniformity of speed, and freedom from mechanical and electrical vibrations.

Such turntables should rotate at a speed of 78.26 R. P. M. and this speed must be uniform, since any variation in the speed results in noisy operation, producing what is commonly called "wows" or "flutter."

A "wow" is caused by a variation in the speed of each revolution of the turntable, and may be caused by gears that have a tight spot in every revolution of the shaft, or in the case of a rim drive motor, it may be caused by irregularities in the turntable rim. "Flutter" is similar to "wow" but of a higher period of recurrence, and is generally caused by mechanical vibration, set up by unbalanced dynamic forces in the rotor of the associated electric motor.

Other troubles encountered in phonomotor design are deviations in speed of the turntable, from the correct speed, due to variations in the line voltage which operates the motor, or variations in record drag caused by variations in sizes and cut of the records; changes in motor speed due to temperature rise, or changes in turntable speed due to various weight pickups.

A synchronous motor would naturally solve all of the problems of turntable speed variation, but such motors have the greater fault of 120 cycle hum, and vibration in the 78.26 R. P. M. sub-synchronous type, and furthermore, are not self-starting, for which reasons they are not practical and have never come into extensive use for this purpose. Synchronous motors of the self-starting variety are too expensive to be used in such machines.

The shaded pole type of motor has come into most general use for turntable drives, as it is self-starting, and if properly designed is reasonably free from 120 cycle hum. Such motors are termed constant speed in differentiation from synchronous motors, and they have the further advantage of being very low in cost.

Until quite recently gears have been used to reduce the speed of the rotor to the proper turntable speed for playback or reproduction use, but such gears have now been replaced by the lower cost type of rim drive turntables, having an idler wheel interposed between the rotor shaft and the depending, peripheral turntable rim, whereby the turntable is frictionally driven from the motor.

Turntables for recording purposes, frictionally driven through the medium of an idler wheel, have been used for a number of years. However, in such machines relatively great weight of the parts and power surplus in the motor are relied upon to eliminate incorrect speed, "wow," "flutter," and 120 cycle hum in the recording style of friction idler wheel drive; while the playback or reproduction unit, because of the low cost requirement, must be designed to give the same quality of performance without surplus weight of parts or surplus motor power.

Four pole motors running at 1600 to 1750 R. P. M. have always been thought necessary both for gear drive and friction drive phonomotors, because the relatively slow speed rotor generally does not make as much noise as a rotor running at 3000 R. P. M.

The object of the present invention is to provide a shaded pole motor and means of mounting the same for a phonograph turntable drive so as to overcome the objections and difficulties encountered in present practice.

Another object is to produce a turntable drive that is low in cost, quiet in operation and which will maintain the required uniform speed of rotation.

A further object is to provide a two pole shaded type motor which will drive the turntable quietly and at a more uiform speed, and which can be produced at a lower cost than the customary four pole motor generally used at present.

A still further object is to provide a novel mounting for the motor which will eliminate noise and vibrations.

Another object is to provide a cooling fan mounted upon the rotor shaft of the motor by means of a friction clutch to prevent injury to a person coming into contact with the fan.

Figure 2:
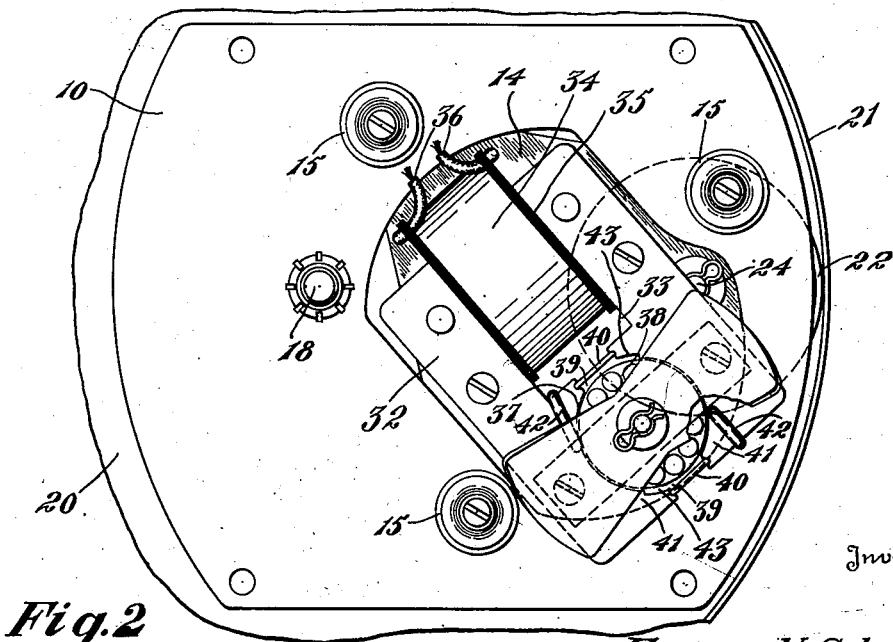

The above objects together with others which will be apparent from the drawings and following description, or which may be later referred to, may be attained by constructing the improved motor turntable drive in the manner illustrated in the accompanying drawings, in which Figure 1 is a fragmentary top plan view of the improved turntable drive, with parts of the turntable broken away to illustrate the friction drive and motor mounting;

Fig. 2, a bottom plan view of the same;

Fig. 3, a vertical section taken as on the line 3—3, Fig. 1;

Fig. 4, a vertical section taken as on the line 4—4, Fig. 1;

Fig. 5, an enlarged detail sectional view of the friction clutch for mounting the cooling fan upon the rotor of the motor; and Fig. 6, a detached perspective view of the movable mounting for the friction wheel;

Similar numerals refer to similar parts throughout the several views.

The turntable operating mechanism is mounted together as a unit upon a base plate 10 adapted to be seated upon and secured to the platform 11 of the cabinet or other support for the phonograph as indicated generally in Fig. 3, occupying a position over the opening 12 in the platform.

The base plate 10 is provided with an opening 13 through which the motor is mounted as will be later described.

The motor supporting plate 14 is mounted spaced above the base plate 10 and over the opening 13 thereof, by means of rubber grommets 15 and spacers 16, and a plurality of depending posts 17 are fixed to said motor mounting plate and extend downwardly through the opening 13 in the base plate for the purpose of supporting the motor which will be later described.

A post 18 extends upwardly from the base plate, being preferably journaled therein in any suitable manner, and the hub 19 of a turntable 20 of sheet metal or the like may be fitted thereover.

The post 18 provides a fixed mounting for the turntable as its axis remains stationary, and the turntable when positioned upon this post is adapted to revolve freely about the same.

The turntable is provided with a depending peripheral flange 21, the inner face of which is adapted to engage the friction tread 22, preferably a hollow rubber tire filled with a suitable liquid such as glycerin, liquid soap or salt brine, fitted peripherally about an idler wheel 23 which is mounted to revolve about a stud 24 carried near the outer end of the plate 25.

This plate is mounted for sliding or swinging movement upon the motor mounting plate 14, by means of the screw 26 which is threaded into the motor mounting plate and located through an enlarged aperture 27 in the plate 25, a flanged washer 28 spacing the head of the screw so as not to bind the plate 25 and at the same time covering the enlarged opening 27. A downturned lug 29 is formed at the inner end of the sliding plate 25 for sliding movement within the slot 30 formed in the motor mounting plate 14, a spring 31 being connected to the sliding plate 25 and to the adjacent edge of the motor mounting plate to urge the tire 22 of the wheel into frictional contact with the rim 21 of the turntable.

The motor which drives the turntable through the friction wheel 23 is a two pole shaded pole type motor, the stator or field member of which is composed of a stack of laminations 32 stamped from sheets of magnetic iron and connected to the depending rods 17 whereby the motor is suspended from the motor mounting plate 14.

This motor is of a non-concentric design, the stator or field member being substantially rectangular in shape with a central opening 33 therein so that one end of the stator may be surrounded by a coil 34 of wire secured upon an insulation spool 35, the ends of the coil being connected to the wires 36 which may lead to any suitable source of electric energy.

At the opposite end of the motor the stator laminations are apertured to provide a substantially circular opening 37 for receiving a cylindric rotor 38 of the squirrel-cage type. The laminations are cut away on diametrically opposite sides of this cylindric opening forming air-gaps as indicated at 39, heavy iron sheets 40 being inserted between the ends of the opposite pole pieces 41 thus formed.

A single shading coil 42 surrounds each pole piece and the inner faces of the poles are cut away as at 43 on diametrically opposite sides so that the air-gap between the squirrel cage rotor and the relined portion of the field or stator is approximately double the air-gap at the center line through the two poles and for a distance equivalent to the width of the shaded pole.

The shaft 44 of the rotor is journaled in bearings 45 mounted in the brackets 46 attached to the opposite sides of the stator and a small pulley 47 is fixed upon the upper end of the shaft and frictionally engages the periphery of the friction wheel 23.

A cooling fan 48 may be mounted upon the lower end of the shaft 47 by means of a friction clutch formed of a felt washer 49 and fiber washers 50 so that the fan will be instantly stopped without injuring a person's hand which may come in contact with the same.

The turntable drive unit above described has many advantages over the units now in general use, one advantage of considerable importance being the low cost of the two pole motor as compared to a four poled motor.

Another advantage resulting from the use of a two pole motor is that the higher speed rotor allows a greater reduction either by gear or idler wheel than the four pole motor. Thus, the turntable and record speed are less affected by changes in rotor speed of a 3000 R. P. M. two pole motor than in a 1600 or 1700 R. P. M. four pole motor.

The higher speed rotor and greater reduction also gives greater freedom from "wows" because of the inertia of the high speed rotor working through the higher ratio of reduction.

By the use of a small diameter rotor the higher rotor speeds encountered cause no additional vibration due to dynamic unbalance, magnetic pull, etc. over that of the conventional four pole motor. Furthermore, the unique method of mounting the motor minimizes the transfer of existing motor vibration to the record and on through the pick-up to be amplified and cause disturbance in the audible reproduction.

By mounting the base plate carrying the stud on which the turntable revolves in the manner illustrated and described solidly to the cabinet, this construction provides high inertia due to the mass and weight of the entire cabinet to any vibration, thus maintaining the turntable free of motor vibration.

The idler wheel 22 is free to rotate in the bearing carried by the plate 25, this plate being free to slide over the surface of the motor mounting plate in such manner as to retain proper vertical position, while free to slide horizontally, this construction being so designed as to minimize wedging tendencies under varying load conditions. It is well-known to those skilled in the art that such wedging action as encountered where the points of contact of the motor drive pulley and the turntable rim are approximately diametrically opposite each other creates an unstable turntable speed condition which is the cause of objectionable "wows" or transient frequency variations in reproduction due to uneven turntable speed.

In the present invention a relation of more nearly ninety degrees between the motor drive pulley and turntable point of contact on the idler wheel is maintained in order to minimize this wedging action and at the same time provide a positive drive to the depending rim flange of the turntable.

I claim:

A friction transmission for phonograph turntables, including a supporting plate, a turntable rotatably mounted above said plate and having an annular flange, a motor, a friction pulley operatively connected to the motor, a mounting plate slidable upon the top of the supporting plate, a screw in the supporting plate and received in an opening in the mounting plate of considerably greater diameter than the screw, a flanged washer on the screw covering said opening and spacing the head of the screw from the supporting plate so as to allow free movement of the mounting plate, a downturned lug at one end of the mounting plate, there being an elongated slot in the supporting plate, said lug being slidably received in said slot, an idler wheel rotatably mounted upon the mounting plate and having a friction tire for contact with said friction pulley and said annular flange, and spring means associated with the mounting plate for urging the idler wheel into contact with the motor pulley and turntable flange.

EMMOR V. SCHNEIDER.